US008793767B2

(12) United States Patent
Schweitzer, III et al.

(10) Patent No.: US 8,793,767 B2
(45) Date of Patent: Jul. 29, 2014

(54) NETWORK ACCESS MANAGEMENT VIA A SECONDARY COMMUNICATION CHANNEL

(75) Inventors: Edmund O. Schweitzer, III, Pullman, WA (US); David E. Whitehead, Pullman, WA (US); Rhett Smith, Kuna, ID (US); Mark Weber, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 0 days.

(21) Appl. No.: 13/599,927

(22) Filed: Aug. 30, 2012

(65) Prior Publication Data
US 2014/0068711 A1    Mar. 6, 2014

(51) Int. Cl.
*H04L 29/06*    (2006.01)
*G06F 21/60*    (2013.01)
*G06F 21/82*    (2013.01)

(52) U.S. Cl.
CPC .............. *G06F 21/606* (2013.01); *G06F 21/82* (2013.01)
USPC ............................... 726/3; 713/168; 709/229

(58) Field of Classification Search
CPC ....... G06F 21/606; G06F 21/73; G06F 21/00; G06F 21/31; G06F 21/85; H04L 63/0428; H04L 63/0442; H04L 63/0823; H04L 63/20; H04L 67/125; H04L 9/32
See application file for complete search history.

(56) References Cited

U.S. PATENT DOCUMENTS

| 7,251,570 | B2 * | 7/2007 | Hancock et al. ................. 702/57 |
| 2007/0067625 | A1 * | 3/2007 | Jiang et al. ..................... 713/168 |
| 2008/0150753 | A1 * | 6/2008 | Rudolf et al. ............ 340/870.03 |
| 2009/0070447 | A1 * | 3/2009 | Jubinville et al. ............. 709/223 |
| 2010/0306533 | A1 * | 12/2010 | Phatak .......................... 713/156 |
| 2011/0088096 | A1 * | 4/2011 | Hilton ............................. 726/26 |

OTHER PUBLICATIONS

PCT/US2013/056842 Patent Cooperation Treaty, International Search Report and Written Opinion of the International Searching Authority, Sep. 19, 2013.

* cited by examiner

*Primary Examiner* — Shewaye Gelagay
(74) *Attorney, Agent, or Firm* — Stoel Rives LLP (57) ABSTRACT

The present disclosure provides for selectively enabling a primary communication channel upon receipt of enablement instructions received via a secondary communication channel. In some embodiments, a first intelligent electronic device (IED) may be connected to a second IED via a primary communication channel. In various embodiments, the primary communication channel may be selectively and/or temporarily enabled by transmitting an enablement instruction via a secondary communication channel. The secondary communication channel may be relatively more secure than the primary communication channel. In some embodiments, the secondary communication channel may also connect the first and second IEDs. Accordingly, the first IED may transmit an enablement instruction to the second IED in order to temporarily enable communication via the primary communication channel between the first and second IEDs.

33 Claims, 7 Drawing Sheets

NETWORK ACCESS MANAGEMENT VIA A SECONDARY COMMUNICATION CHANNEL

TECHNICAL FIELD

This disclosure relates to network security and communications. Specifically, this disclosure relates to selectively enabling communication over a first communication channel after receiving an enablement instruction via a second communication channel.

BRIEF DESCRIPTION OF THE DRAWINGS

Non-limiting and non-exhaustive embodiments of the disclosure are described herein with reference to the figures described below.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Intelligent electronic devices (IEDs) may be used for monitoring, protecting, and/or controlling industrial and utility equipment, such as in an electric power delivery system. For example, an IED, such as a programmable logic controller (PLC), protective relay, real-time automation controller (RTAC), or the like may monitor, protect, and/or control various components within an industrial or utility system, such as a power delivery system (which may include, for example, electric power generation, transmission, distribution, and/or consumption). IEDs may be monitored, controlled, and/or managed using any of a wide variety of communication methods. For example, IEDs may include communication channels utilizing Ethernet or serial connections and may implement any of a wide variety of communication protocols and security measures. The systems and methods disclosed herein may be implemented in gateways, firewalls, and other network devices configured to implement modern access control paradigms across a wide variety of networked devices.

Although various embodiments and descriptions herein refer to a power delivery system, the principles and applications described herein are applicable to various types of industrial, utility, or other computing systems.

In one embodiment, a first IED may be connected to a second IED via a primary communication channel that is relatively less secure. Disabling the primary communication channel may reduce unauthorized access to the second IED. Of course, this prevents communication from the first IED to the second IED via the primary communication channel. In various embodiments, the primary communication channel may be selectively and/or temporarily enabled by transmitting an enablement instruction via a secondary communication channel. The secondary communication channel may be relatively secure. In some embodiments, the secondary communication channel may also connect the first and second IEDs. Accordingly, the first IED may transmit an enablement instruction to the second IED in order to temporarily enable communication via the primary communication channel between the first and second IEDs.

Alternatively, the secondary communication channel may connect the second IED to a third IED. In such an embodiment, when the third IED transmits an enablement instruction to the second IED via the secondary communication channel, the second IED may enable the primary communication channel, allowing the first IED to communicate with the second IED.

In one embodiment, the primary communication channel may utilize a publicly accessible wide area network connection, such as via Ethernet, while the secondary communication channel may utilize a private, more secure, serial connection, such as in a supervisory control and data acquisition (SCADA) network. In other embodiments, the primary communication channel and the secondary communication channel may utilize the same physical connections or physical connection types, but implement different communication protocols, security measures, error detection, error correction, transmission algorithms, and/or other communication variations.

According to various embodiments, an IED may perform a monitoring, controlling, and/or protective function via a first, private network. For example, the IED may be a part of a synchronous optical networking (SONET) network or a synchronous digital hierarchy (SDH) network. The IED may be managed and/or controlled via the SONET or SDH network, or alternatively, the IED may be managed and/or controlled via a separate network connection. For example, an access controller in communication with the IED may enable a local or remote operator to configure settings within the IED via a serial or parallel network connection, such as an Ethernet connection.

An IED, potentially via the access controller, may include a primary network connection and a secondary network connection. In some embodiments, the primary network connection may be selectively enabled and disabled via enablement instructions provided via the secondary network connection. The primary network connection may provide a relatively high bandwidth connection, but be relatively less secure. The secondary network connection may be relatively secure (physically or virtually), but have a relatively limited bandwidth. Accordingly, by disabling the primary network connection until an enablement instruction is received via the secondary network connection, the overall security of the system is improved while still allowing for high-bandwidth network connections.

The phrases "connected to" and "in communication with" refer to any form of interaction between two or more components, including mechanical, electrical, magnetic, and electromagnetic interaction. Two components may be connected to or in communication with each other, even though they may not be in direct contact with each other, and even though there may be intermediary devices between the two components.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. Moreover, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. In addition, the steps of a method do not necessarily need to be executed in any specific order, or even sequentially, nor need the steps be executed only once, unless otherwise specified.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
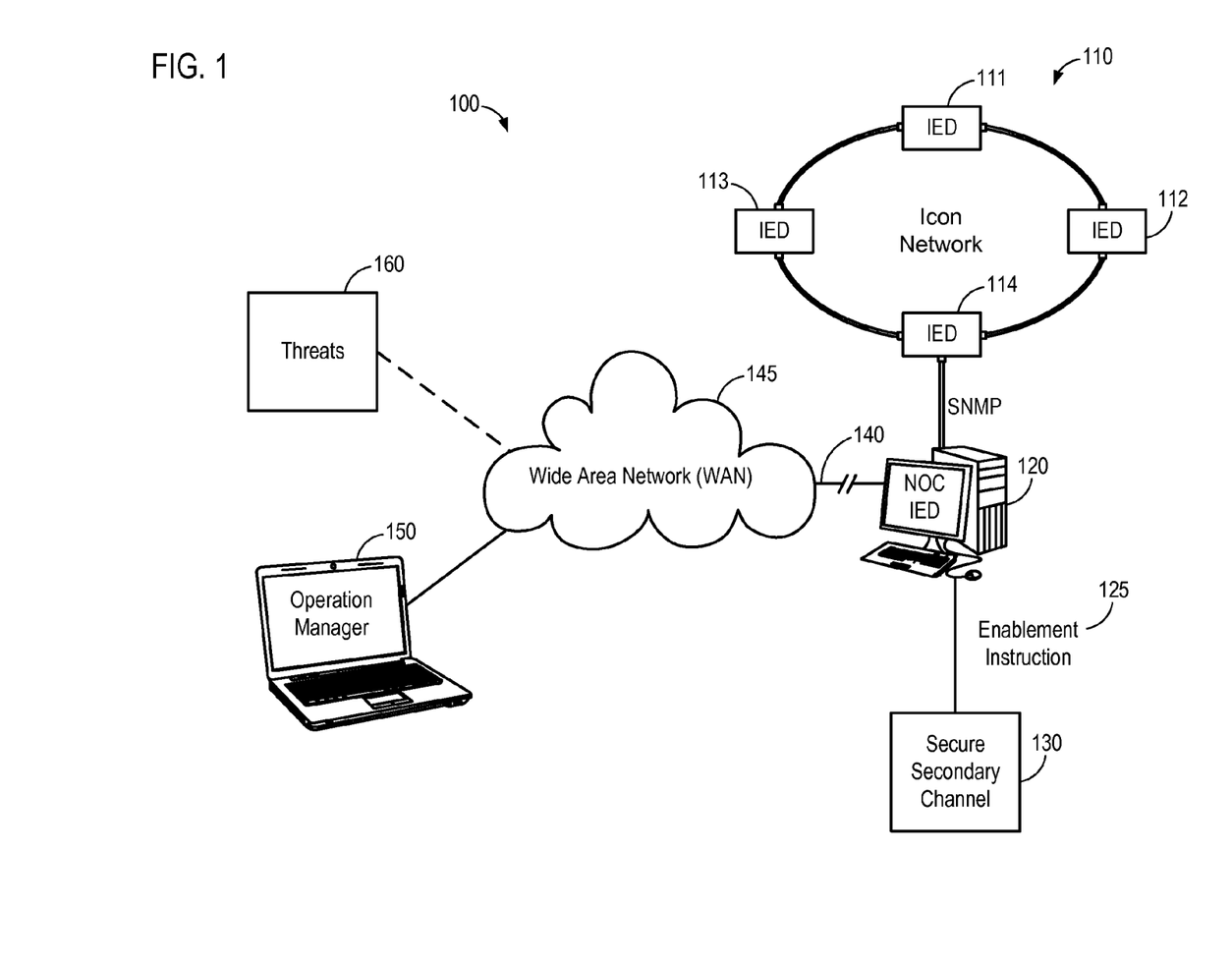
FIG. 1 illustrates an embodiment of a system including an intelligent electronic device (IED) performing the functions of a network operations center (NOC), including a primary communication channel and a secondary communication channel.

FIG. 1 illustrates an embodiment of a system 100 including an intelligent electronic device (IED) 120 performing the functions of a network operations center (NOC). The NOC IED 120 is in communication with the IEDs 111, 112, 113, and 114 in a secure integrated communications optical network (ICON) 110. The IEDs 111, 112, 113 and 114 may be configured to perform various control, automation, monitoring, and/or protection functions in an electric power distribution system. However, the systems and methods described herein are applicable to any of a wide variety of communication networks. The NOC IED 120 may provide limited access to the IED 114 (and/or the IEDs 111, 112, and/or 113) by external devices, such as the operation manager 150 and threats 160.

As illustrated, the NOC IED 120 may be in communication with an operation manager 150 via a wide area network (WAN) 145. The WAN 145 may be publicly accessible, such that threats 160 may need to be detected and/or prevented from accessing the secure ICON 110. In order to prevent unauthorized access or attacks, such as threats 160, the primary communication channel 140 connecting the NOC IED 120 to the WAN 145 may be disabled. The primary communication channel 140 may be selectively enabled on a temporary basis and/or with limited accessibility upon receiving enablement instructions 125 via a secure secondary channel 130.

Thus, the primary communication channel 140 may be disabled until an enablement instruction 125 is provided via the secondary communication channel 130. The secondary communication channel 130 may be physically and/or virtually more secure than the primary communication channel 140. In some embodiments, the secondary communication channel 140 may be accessible to the operation manager 150. Alternatively, the secondary communication channel 140 may be inaccessible to the operation manger 150, requiring a third party to effectively authorize the communication temporarily between the operation manager 150 and the NOC IED 120 via the primary communication channel 140.

According to various embodiments, the primary communication channel 140 may be disabled after a predetermined time period, following a predetermined number of connections, and/or after a disablement instruction is received via the secondary communication channel 130. For example, the secondary communication channel 130 may comprise a contact input that, when toggled, selectively enables and disables communication via the primary communication channel 140. The contact input may be accessible to the operation manager 150, or only accessible to a third party access controller.

Figure 2:
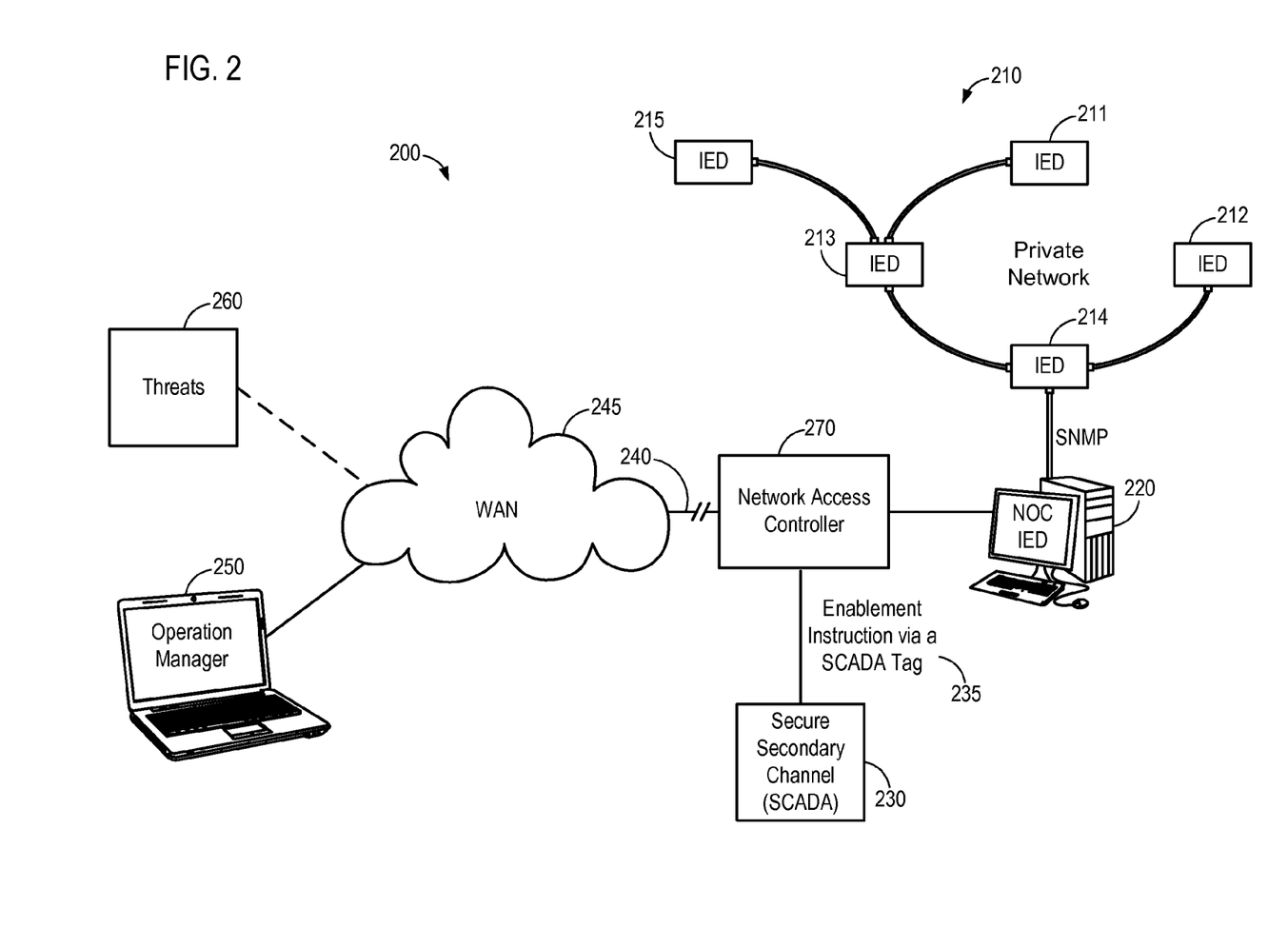
FIG. 2 illustrates an embodiment of a system including a network access controller configured to selectively enable access via a primary communication channel upon receiving an enablement instruction from a secondary communication channel.

FIG. 2 illustrates an embodiment of a system 200 including a network access controller 270 configured to selectively enable access via a primary communication channel 240 upon receiving an enablement instruction 235 from a secondary communication channel 230. In the illustrated embodiment, the network access controller connects a control and data acquisition (SCADA) network (via the secure secondary channel 230) to a NOC IED 220. The NOC IED 220 may control access and/or communication from a private network 210, including IEDS 211, 212, 213, 214, and 215. The NOC IED 220 may communicate with the IED 214 using simple network management protocol (SNMP). The secure secondary channel 230 may be able to communicate freely (i.e. the communication channel may be enabled) with the network access controller 270. Any of a wide variety of authentication, encryption, and/or other security measures may be implemented between the network access controller 270 and the SCADA network.

The network access controller 270 may also be configured to selectively allow access via the primary communication line 240 over a WAN 245. The WAN 245 may not be as inherently secure as the secondary communication channel 230. For instance, unauthorized threats 260 may attempt to access the network access controller 270. According to the presently described systems and methods, one method of minimizing the threats 260 is to selectively disable the primary communication channel 240. The network access controller 270 may selectively enable the primary communication channel 240 when an enablement instruction 235 is received from the secure secondary communication channel 230. In the illustrated embodiment, the enablement instruction may comprise a SCADA tag transited by a device on the SCADA network connected to the network access controller via the secure secondary communication channel 230. The primary communication channel 240 may comprise a relatively high bandwidth Ethernet connection to the WAN 245. Accordingly, a relatively low bandwidth enablement instruction 235 may be used to grant temporary and/or selective access to a network access controller 270 (or an associated network 210) via a high bandwidth, potentially less secure, communication channel.

In some embodiments, the operation manager 250 may be connected to the network access controller 270 only through the WAN 245 and the primary communication channel 240. In other embodiments, the operation manager 250 may also have access to the network access controller 270 via the secure secondary communication channel 230 using a SCADA connection. Additionally, the enablement instruction 235 may include an instruction to initiate a single communication session via the primary communication channel 240. The enablement instruction 235 may include a time period until the primary communication channel 240 should be disabled. The enablement instruction 235 may include an Internet Protocol (IP) address, media access control (MAC) address, and/or other identifying characteristic of the operation manager 250 in order to provide additional security. The network access controller 270 may receive a disablement instruction via the secure secondary communication channel 230, the NOC IED 220, and/or the operation manager 250 and disable the primary communication channel 240 in response. Additionally, the network access controller may be configured to disable the primary communication channel 240 in response to a detected threat.

Figure 3:
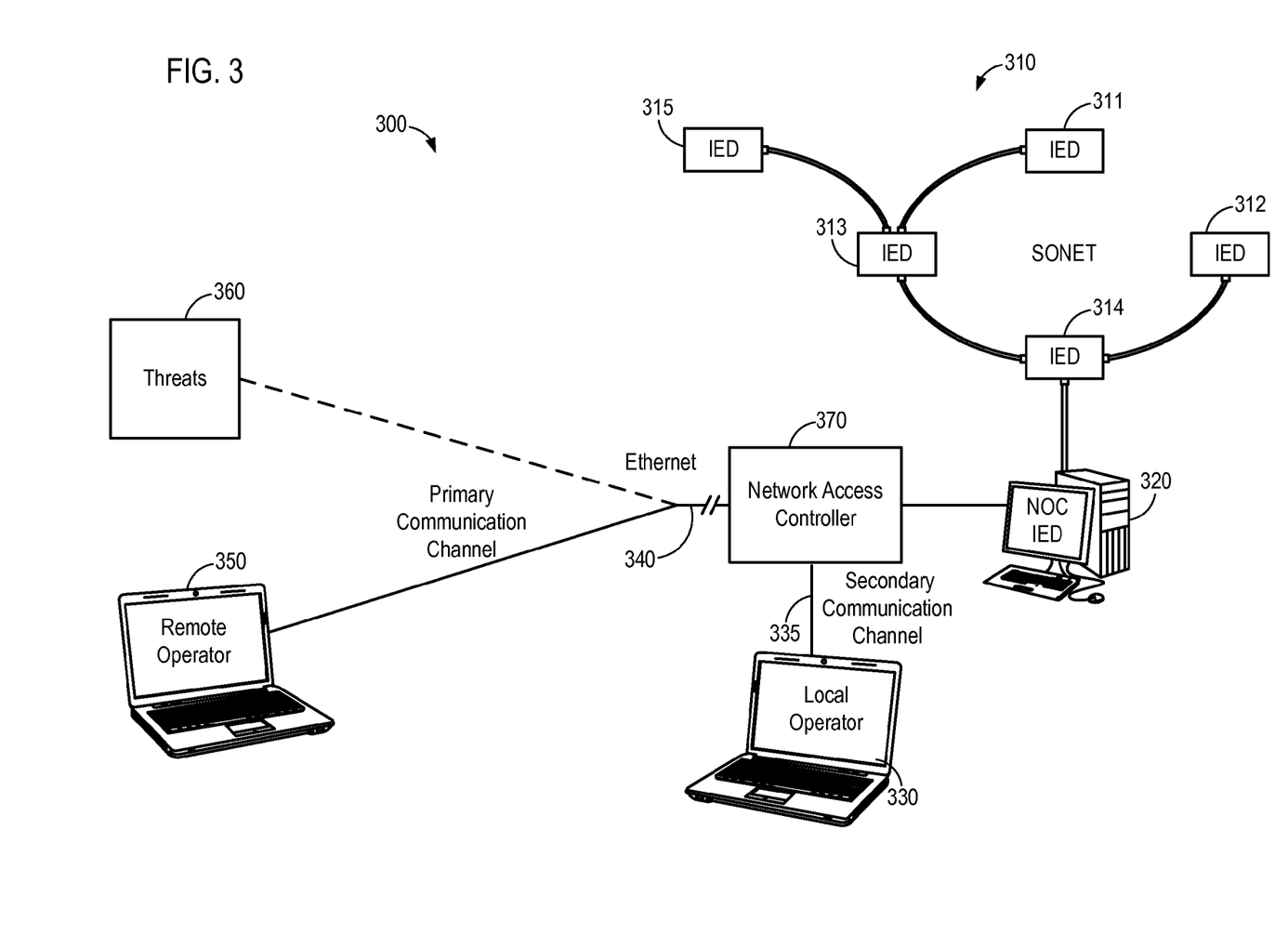
FIG. 3 illustrates an embodiment of a system where a local operator may provide an enabling signal to a network access controller in order to enable access by a remote operator via a primary communication channel.

FIG. 3 illustrates an embodiment of a system 300 where a local operator 330 may be connected to a network access controller 370 via a secondary communication channel 335. The local operator may be connected to a local network 310, including multiple IEDs 311, 312, 313, 314, and 315, via the network access controller 370 and/or a NOC IED 320. The NOC IED 320 may be configured to manage communication between the IEDs 311-315 on a SONET network. The local operator 330 may communicate via the access controller 370 via the secondary communication channel using any of a wide variety of communication ports, links, protocols, and/or communication types. For example, the local operator 330 may be connected to the network access controller 370 via an Ethernet connection, a serial connection, as part of a SCADA network, as part of a SONET network, using a deterministic network, using a physically secure communication line, using a wireless communication network, and/or any other network type. In various embodiments, the secondary communication may be considered more secure than a primary communication channel 340.

The primary communication channel 340 may be configured to connect a remote operator 350 to the network access controller 370. The network access controller 370 may selectively enable and disable the primary communication channel 340 in order to prevent threats 360 from obtaining unauthorized access to local operator 330, NOC IED 320, and/or local network 310. The network access controller 370 may selectively enable the primary communication channel 340 when so instructed by the local operator 330. Accordingly, a local operator 330 may authorize the remote operator 350 to connect to NOC IED 320 and/or local network 310 via the primary communication channel 340 by transmitting enablement instructions to the network access controller 370.

In some embodiments, the local operator 330 and the remote operator 350 may be the same operator and/or physical machine. In such an embodiment, a generally less secure communication channel (e.g., the primary communication channel 340) may be selectively enabled using a more secure communication channel (e.g., the secondary communication channel 335). This may be useful, for example, when the primary communication channel provides superior access, control, bandwidth, flexibility, and/or other desirable communication feature, as compared to the more secure secondary communication channel.

In some embodiments, the primary communication channel 340 and the secondary communication channel 335 may utilize different types of physical connections, cables, physical ports, virtual ports, and/or communication protocols, but may be otherwise similar. In some embodiments, the primary communication channel 340 and the secondary communication channel 335 may be a part of the same or different networks, may utilize the same physical connection, may utilize the same type of physical connection, and/or may utilize the same communication protocol. In such embodiments, a first communication channel is used to selectively enable a second communication channel (or vice versa).

Figure 4A:
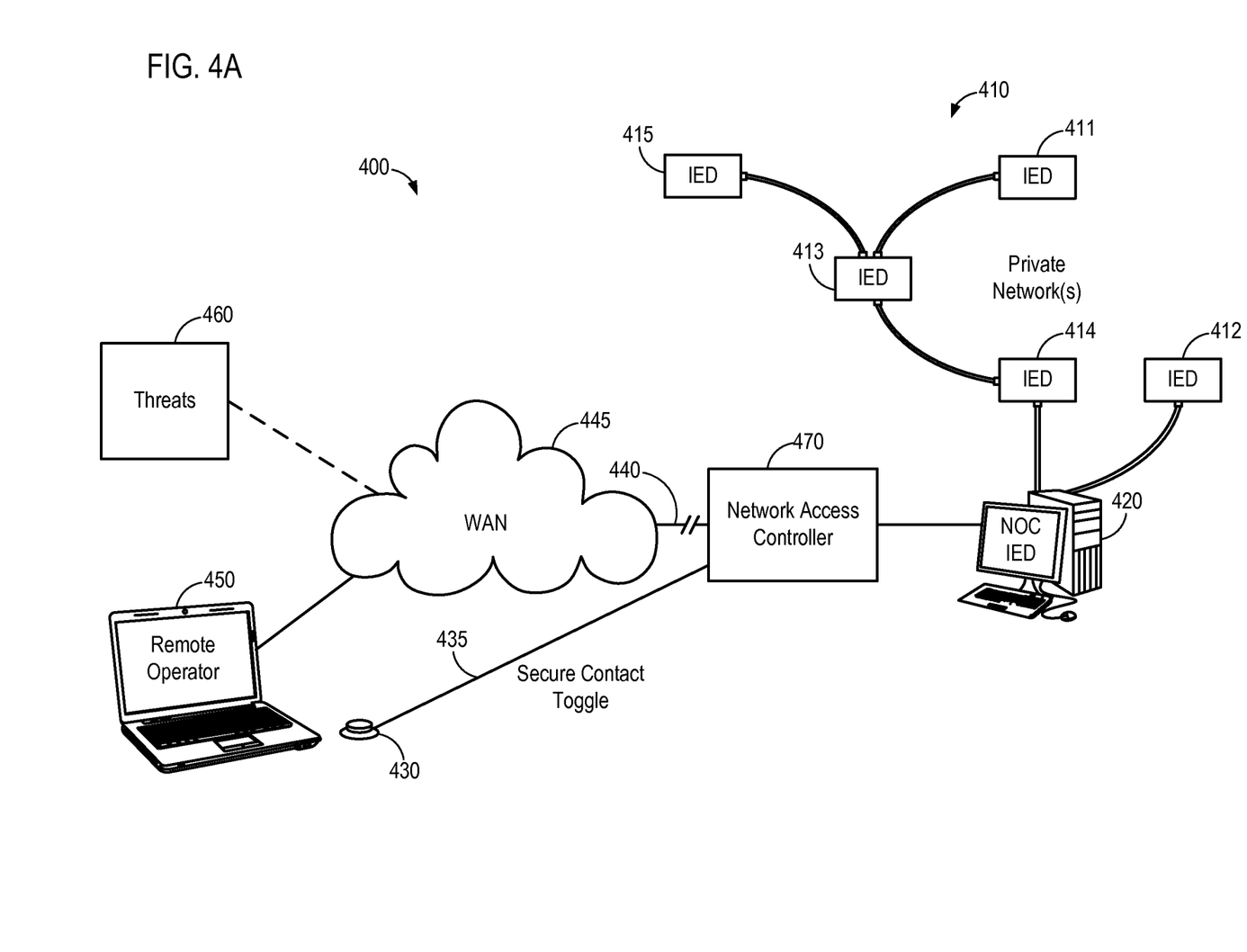
FIG. 4A illustrates an embodiment of a system in which a remote operator may provide an enablement instruction via a physically secure secondary communication channel in order to enable access via a primary communication channel.

FIG. 4A illustrates an embodiment of a system 400 in which a remote operator 450 may provide an enablement instruction via a physically secure secondary communication channel in order to enable access via a primary communication channel 440. As illustrated, the secure secondary communication channel may comprise a contact input 430, such as a button or a switch, configured to transmit a signal 435 toggled between two or more states. Depending on the state of the contact input 430, a network access controller 470 may selectively enable the primary communication channel 440. The remote operator 450 may set the contact input 430.

A private network(s) 410, including IEDs 411, 412, 413, 414, and 415 may be managed by a NOC IED 420. NOC IED 420 may be in communication with, or alternatively include, the network access controller 470. In some embodiments, the NOC IED 420 may be omitted. Remote access to the private network 410 may be accessible through the primary communication channel 440, but the primary communication channel 440 may remain disabled unless the contact input 430 is toggled to an enabling state. In such an embodiment, the private network 410 is protected from threats 460 that may attempt (successfully or unsuccessfully) to gain unauthorized access via the network access controller 470 and/or the NOC IED 420.

To gain access to the private network 410 via a relatively unsecure WAN 445 connected to the primary communication channel 440, the remote operator 450 may temporarily enable the primary communication channel 440 by transmitting an enablement instruction by toggling the contact input 430. The network access controller 470 may be configured to interpret the enablement instruction in any of a wide variety of ways. For example, primary communication channel 440 may be enabled only for the first connection request, enabled for a predetermined time period, enabled until the state of the contact input is changed, and/or enabled for a single communication connection.

Figure 4B:
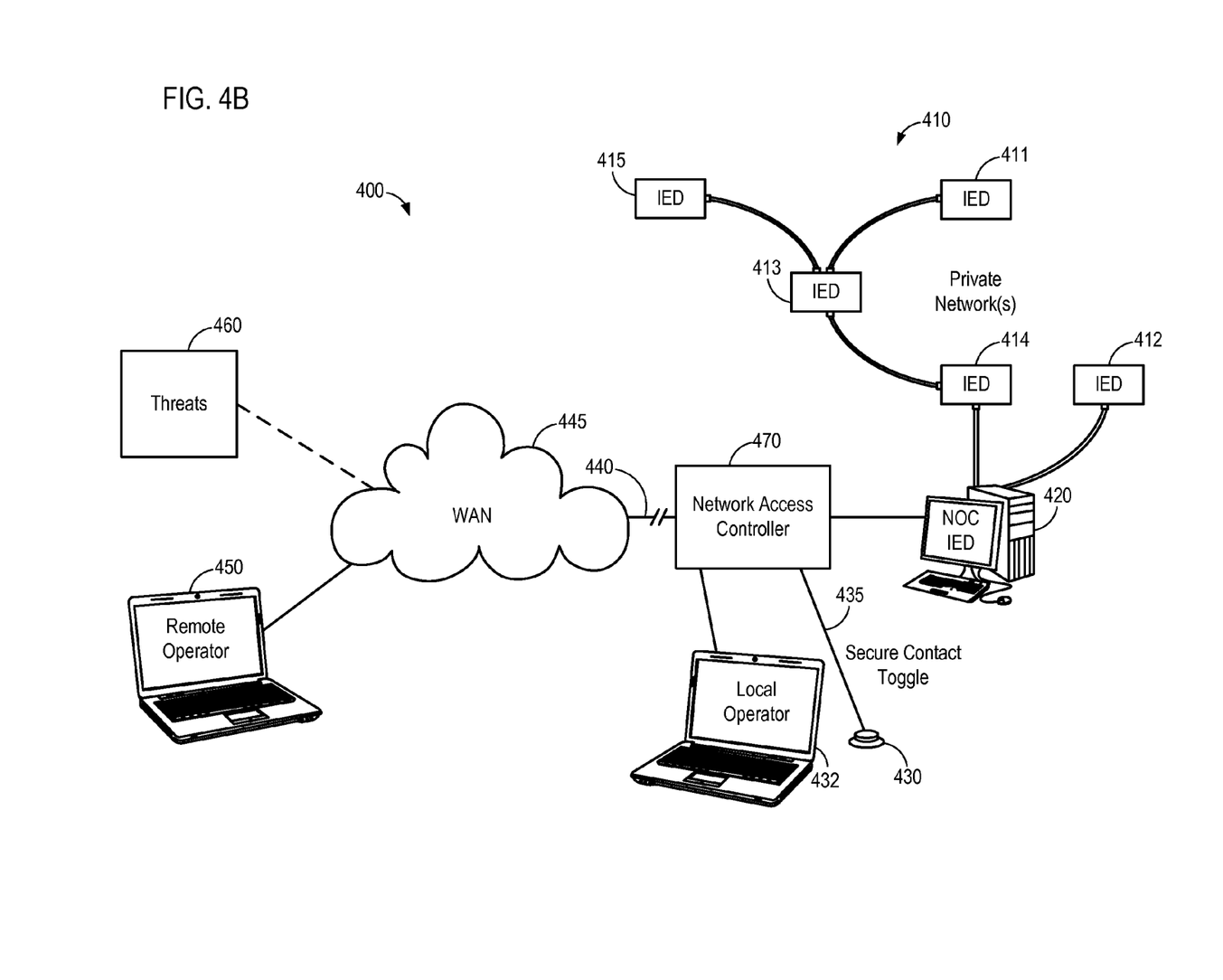
FIG. 4B illustrates an embodiment of a system in which a local operator may provide an enablement instruction via a physically secure secondary communication channel to enable access to a remote operator via a primary communication channel.

FIG. 4B illustrates an embodiment of the system 400 in which a local operator 432 may provide an enablement instruction via the physically secure secondary communication channel to enable access to the remote operator 450 via the primary communication channel 440. As in FIG. 4A, the secure secondary communication channel may comprise a contact input 430, such as a button or a switch, configured to transmit a signal 435 toggled between two or more states. Depending on the state of the contact input 430, the network access controller 470 may selectively enable the primary communication channel 440.

In one embodiment, the remote operator 450 may provide authentication credentials to the local operator 432. For example, the remote operator 450 may "badge in," scan a keycard, send an electronic communication to the local operator, call the local operator, and/or otherwise provide authenticating information. The local operator 432 may then set the contact input 430 to allow the remote operator 450 temporary access via the primary communication channel 440. The local operator 432 may be a human operator, such as an operations manager of a substation, or an automated device or computer configured to authenticate the remote operator 450 and then toggle the contact input 430 automatically.

The contact input 430 may comprise a separate physical channel configured to undergo a physical state change indicating whether or not the primary communication channel 440 should be enabled or disabled. Alternatively, the contact input 430 may comprises a logical input into a communication system, such as an RTAC, configured to selectively enable and disable the primary communications channel 440.

Figure 5:
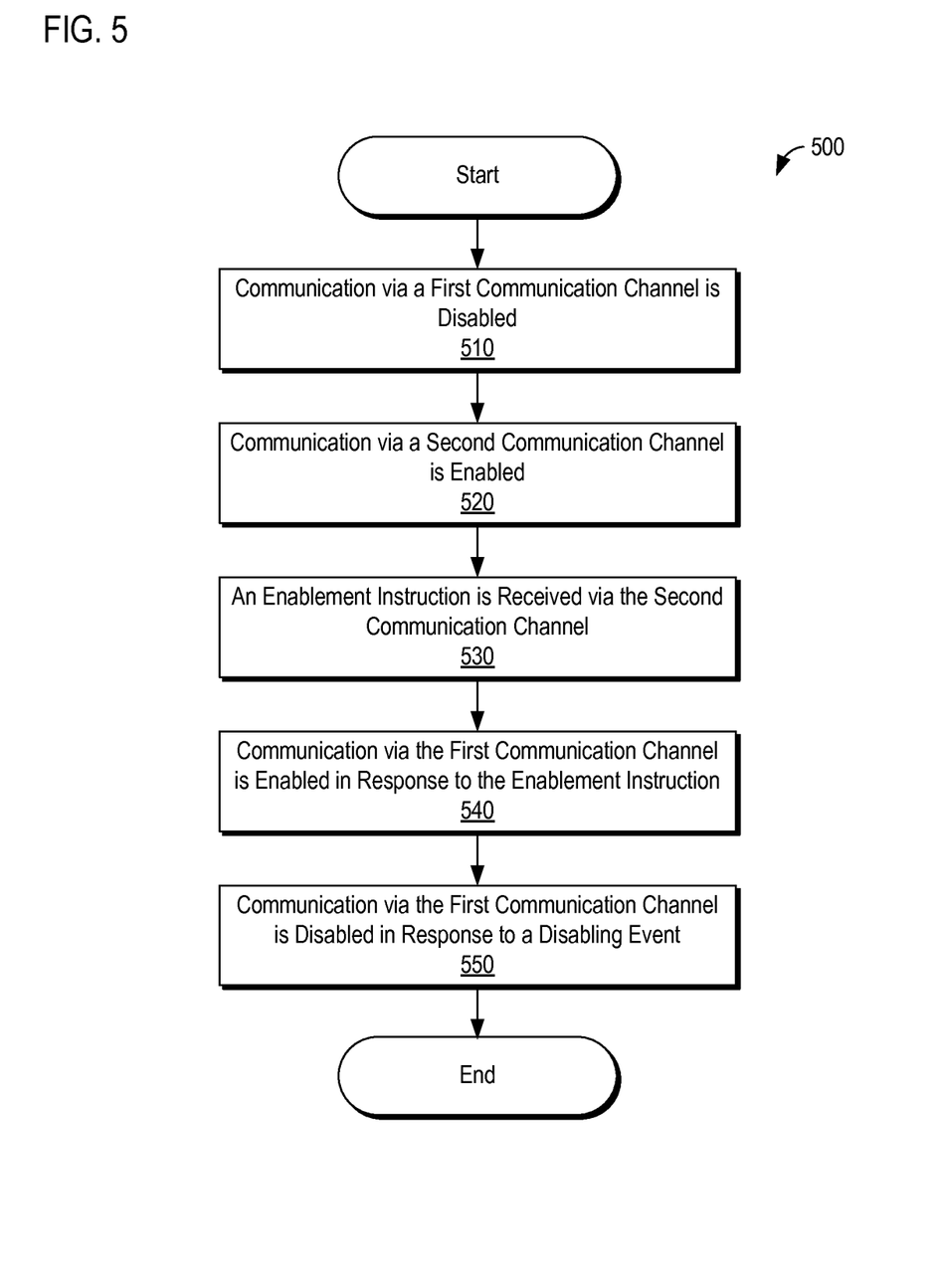
FIG. 5 illustrates a flow chart of an embodiment of a method for selectively enabling communication over a first communication channel in response to receiving an enablement instruction via a second communication channel.

FIG. 5 illustrates a flow chart of an embodiment of a method 500 for selectively enabling communication over a first communication channel in response to receiving an enablement instruction via a second communication channel. The steps of the method 500 need not be performed in the illustrated order, nor do they necessarily need to all be performed or only performed once. In a communication system, a first communication channel may be disabled, at 510. A second communication channel may be enabled and configured to receive communication, at 520. An enablement instruction may be received via the second communication channel, at 530. Communication via the first communication channel may be enabled in response to the enable instruction, at 540. Communication via the first communication channel may be disabled in response to a disabling event, at 550.

For example, an access controller for managing communication with an IED may be configured to communicate via two communication channels, a first communication channel and a second communication channel. The access controller may disable the first communication channel to prevent unauthorized access or access attempts, at 510. The access controller may, however, receive communication via an enabled, second communication channel, at 520. In some embodiments the second communication channel may be configured to communicate with the IED. For example, the second communication channel may comprise a fully-functioning network utilizing one or more physical network connections, cables, protocols, and/or other networking paradigm. As specific examples, the second communication channel may be a part of a SONET, SCADA, EtherCat, IP over Ethernet, and/or other serial or parallel network. Alternatively, the second communication channel may be dedicated to selectively transmitting an enablement instruction to the access controller.

The access controller may receive enablement instructions via the second communication channel instructing the access controller to enable the first communication channel, at 530. The access controller may enable the first communication channel in response to the enablement instructions, at 540. In various embodiments, the access controller may be configured to enable the first communication channel permanently, for a selected time period, and/or until a disablement instruction is provided. The access controller may be configured to enable the first communication channel for a specific IP address, MAC address, or other identifying characteristic provided in the enablement instruction. The access controller may be configured to enable the first communication channel for only a predetermined number of access attempts or communication sessions. The access controller may disable the first communication channel in response to a disabling event, at 550. The disabling event may comprise a disablement instruction provided by a remote IED, a local IED, the access controller, a third party, a time limit, an access restriction, inability to verify login credentials, and/or other event.

Figure 6:
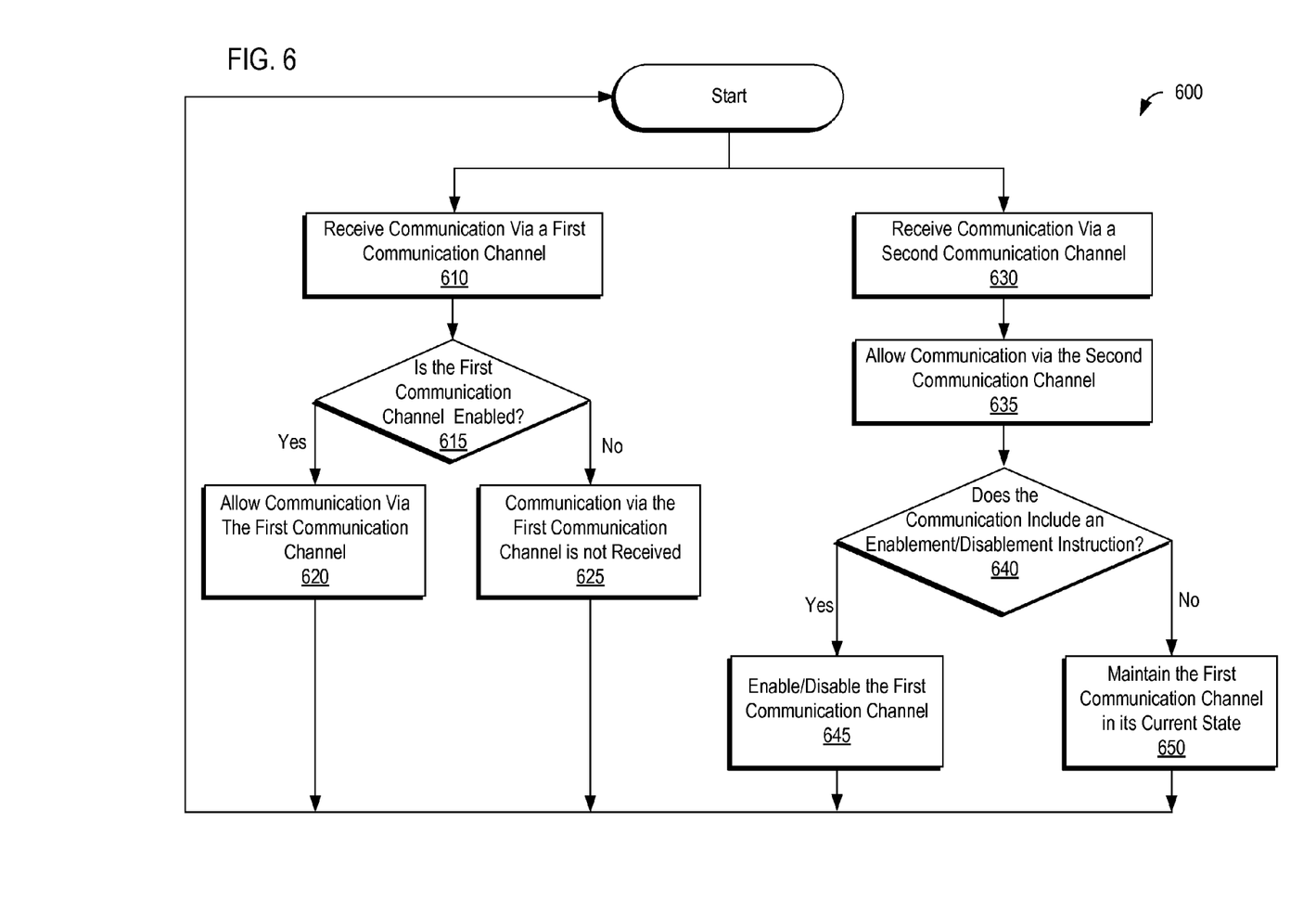
FIG. 6 illustrates a flow chart of an embodiment of an IED's response to communications received via first and second communication channels, depending on the state of the first communication channel.

FIG. 6 illustrates a flow chart of an embodiment of an IED's response 600 to communications received via first and second communication channels, depending on the state of the second communication channel. Initially, communication may be received via a first communication channel, at 610. If the first communication channel is not enabled, at 615, then the communication received via the first communication channel is not received, at 625. Alternatively, if the first communication channel is enabled, at 615, then the communication via the first communication channel is allowed. Although the communication may be allowed, at 620, an access controller may still require a remote IED to provide appropriate login credentials or implement other encryption and/or security measures to ensure authorized access.

Communication received via the second communication channel, at 630, may be allowed, at 635. Again, the communication via the second communication channel, at 630, may be allowed only in the sense that the communication will be considered by the access controller. Appropriate login credentials, security measures, encryption protocols, and/or the like may be required in order for a local or remote IED to communicate via the access controller or with the access controller. If the communication includes an enablement or disablement instruction associated with the first communication channel, at 640, then the first communication channel may be selectively enabled or disabled, at 645. If the communication does not include an enablement or disablement instruction, at 640, then the state (enabled or disabled) of the first communication channel may be maintained, at 650.

The above description provides numerous specific details for a thorough understanding of the embodiments described herein. However, those of skill in the art will recognize that one or more of the specific details may be omitted, modified, and/or replaced by a similar process or system.

What is claimed is:

1. A method for enabling network communication with an intelligent electronic device (IED), comprising:
    disabling communication via a first communication channel with the IED to prevent communication via the first communication channel;
    enabling communication via a second communication channel with the IED, wherein the first communication channel and the second communication channel are physically distinct communication channels,
    wherein the second communication channel is a private communication channel that is physically secure;
    receiving an enablement instruction via the private and physically secure second communication channel, the enablement instruction providing an instruction to activate the first communication channel;
    enabling communication via the first communication channel with the IED in response to the enablement instruction; and
    receiving communication via the first communication channel.

2. The method of claim 1, further comprising the intelligent electronic device disabling communication via the first communication channel in response to a disabling event.

3. The method of claim 1, wherein the first communication channel utilizes a first communication protocol and the second communication channel utilizes a second communication protocol.

4. The method of claim 1, wherein the first communication channel utilizes a first type of physical network link and the second communication channel utilizes a second type of physical network link.

5. The method of claim 1, wherein the first communication channel communicates via a first communication network and the second communication channel communicates via a second, independent communication network.

6. The method of claim 1, wherein the second communication channel comprises a contact input.

7. The method of claim 1, wherein the second communication channel comprises an Ethernet link.

8. The method of claim 1, wherein the second communication channel comprises a serial port.

9. The method of claim 1, wherein the first communication channel comprises a wireless network.

10. The method of claim 9, wherein the wireless network comprises a cellular network.

11. The method of claim 1, wherein the enablement instruction comprises a supervisory control and data acquisition tag.

12. The method of claim 1, wherein the enablement instruction comprises a toggle of a contact input.

13. The method of claim 1, wherein the first communication channel comprises a network communication channel accessible via a wide area network (WAN) and the second communication channel comprises a network communication channel accessible via a secure network.

14. The method of claim 2, wherein the disabling event comprises a disablement instruction received via one of the second communication channel and the first communication channel.

15. The method of claim 2, wherein the disabling event comprises an expiration of a time limit.

16. The method of claim 1, wherein the step of enabling communication via the first communication channel further comprises encryption of communication via the first communication channel.

17. A system for managing network communication with an intelligent electronic device (IED), comprising:
    a first communication channel configured to facilitate network communication with the IED, the first communication channel configured to be selectively enabled and disabled, wherein the first communication channel is prevented from communicating when disabled;
    a second communication channel for receiving an enablement instruction, the enablement instruction providing an instruction to activate network communication via the first communication channel,
    wherein the second communication channel is a private communication channel that is physically secure; and
    an access module configured to enable network communication via the first communication channel in response to receiving the enablement instruction via the private and physically secure second communication channel,
    wherein the first communication channel and the second communication channel are physically distinct communication channels.

18. The system of claim 17, wherein the first communication channel utilizes a first communication protocol and the second communication channel utilizes a second communication protocol.

19. The system of claim 17, wherein the first communication channel utilizes a first type of physical network link and the second communication channel utilizes a second type of physical network link.

20. The system of claim 17, wherein the first communication channel communicates via a first communication network and the second communication channel communicates via a second, independent communication network.

21. The system of claim 17, wherein the second communication channel comprises a contact input.

22. The system of claim 17, wherein the second communication channel comprises an Ethernet link.

23. The system of claim 17, wherein the second communication channel comprises a serial port.

24. The system of claim 17, wherein the first communication channel comprises a wireless network.

25. The system of claim 24, wherein the wireless network comprises a cellular network.

26. The system of claim 17, wherein the enablement instruction comprises a supervisory control and data acquisition tag.

27. The system of claim 17, wherein the enablement instruction comprises a toggle of a contact input.

28. The system of claim 17, wherein the first communication channel comprises a network communication channel accessible via a wide area network (WAN) and the second communication channel comprises a network communication channel accessible via a secure network.

29. The system of claim 17, wherein the access module is configured to disable network communication via the first communication channel in response to a disablement event.

30. The system of claim 29, wherein the disabling event comprises a disablement instruction received via one of the second communication channel and the first communication channel.

31. The system of claim 29, wherein the disabling event comprises an expiration of a time limit.

32. The system of claim 17, wherein the first communication channel is further configured to provide encrypted communications with the IED.

33. A non-transitory computer-readable medium having instructions encoded thereon that, when executed by a processor, are configured to cause the processor to perform operations, the operations comprising:

disabling communication via a first communication channel with an IED to prevent communication via the first communication channel;

enabling communication via a second communication channel with the IED, wherein the first communication channel and the second communication channel are physically distinct communication channels, wherein the second communication channel is a private communication channel that is physically secure;

receiving an enablement instruction via the private and physically secure second communication channel, the enablement instruction providing an instruction to activate communication via the first communication channel;

enabling communication via the first communication channel with the IED in response to the enablement instruction;

receiving communication via the first communication channel; and disabling communication via the first communication channel in response to a pre-defined event.

* * * * *